(12) United States Patent
Guu et al.

(10) Patent No.: US 10,355,354 B2
(45) Date of Patent: Jul. 16, 2019

(54) ARRAY ANTENNA COMMUNICATION SYSTEM AND METHOD THEREFOR

(71) Applicant: NATIONAL CHUNG SHAN INSTITUTE OF SCIENCE AND TECHNOLOGY, Taoyuan (TW)

(72) Inventors: Jiin-An Guu, Taoyuan (TW); Ching-Chyuan Lin, Taoyuan (TW); Chien-Te Yu, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 127 days.

(21) Appl. No.: 15/641,396

(22) Filed: Jul. 5, 2017

(65) Prior Publication Data

US 2019/0013579 A1 Jan. 10, 2019

(51) Int. Cl.
*H01Q 3/02* (2006.01)
*H01Q 3/26* (2006.01)
*H01Q 1/12* (2006.01)
*H04B 7/00* (2006.01)
*G01S 1/00* (2006.01)

(52) U.S. Cl.
CPC ........... *H01Q 3/2652* (2013.01); *H01Q 1/125* (2013.01); *H04B 7/00* (2013.01); *G01S 1/00* (2013.01); *H01Q 3/02* (2013.01)

(58) Field of Classification Search
CPC ......... H01Q 1/125; H01Q 3/02; H01Q 3/2652
USPC .......................................................... 343/760
See application file for complete search history.

(56) References Cited

U.S. PATENT DOCUMENTS 6,377,211 B1 * 4/2002 Hsiung ................ H01Q 1/3275
342/359

\* cited by examiner

*Primary Examiner* — Graham P Smith
(74) *Attorney, Agent, or Firm* — Schmeiser, Olsen & Watts, LLP

(57) ABSTRACT

Array antenna communication system is introduced, which is a communication system that receives a location signal generated by a mobile communication apparatus and accordingly transfers a communication signal with a corresponding phase direction. The system includes an array antenna module and a beamforming circuit. The array antenna module includes a plurality of antenna units arranged in array form. The beamforming circuit is used for receiving a plurality of location signals, a plurality of phase control signals, and transferring a plurality of output signals, wherein the beamforming circuit receives the location signal and accordingly generates the corresponding control signal, and controls the corresponding antenna unit of the array antenna module, so as to enable the antenna unit to move to a position corresponding to a phase and to transfer the plurality of output signals, thereby achieving communication signal enhancement.

10 Claims, 1 Drawing Sheet

ARRAY ANTENNA COMMUNICATION SYSTEM AND METHOD THEREFOR

FIELD OF THE INVENTION

The invention relates to a communication system and a method therefor, and in particular to an array antenna communication system for communication with a mobile communication apparatus and a method therefor.

BACKGROUND OF THE INVENTION

With the development of communication technology, antenna arrays have been utilized for data transmission. Nowadays, antenna arrays have been employed in LTE (Long-Term Evolution) technology. For example, diversity communication or multiplex communication has been used in LTE antenna arrays.

The number of antennas in an antenna array may be more than 100. The communication of antenna arrays can be applied to frequency-division multiplexing mode and time-division duplexing mode. In the frequency-division multiplexing mode, feedback loading will be caused by massive antennas. Thus, it is important to reduce loading in the multiplexing mode.

SUMMARY OF THE INVENTION

It is an objective of the present invention to provide an array antenna communication system and a method thereof, wherein a location signal generated by a mobile communication apparatus is received and accordingly a communication signal with a corresponding phase direction is transferred, thereby achieving communication signal enhancement.

To achieve at least the foregoing objective, an array antenna communication system is provided. The system includes an array antenna module and a beamforming circuit. The array antenna module includes a plurality of antenna units arranged in array form. The beamforming circuit is used for receiving a plurality of location signals, a plurality of phase control signals, and transferring a plurality of output signals, wherein the beamforming circuit receives the location signal and accordingly generates the corresponding control signal, and controls the corresponding antenna unit of the array antenna module, so as to enable the antenna unit to move to a position corresponding to a phase and to transfer the plurality of output signals, thereby achieving communication signal enhancement.

DETAILED DESCRIPTION OF THE PREFERRED EMBODIMENTS

To make it easier for one skilled in the art to understand the object, characteristics and effects of this invention, various embodiments together with the attached drawings for the detailed description of the invention are provided.

Figure 1:
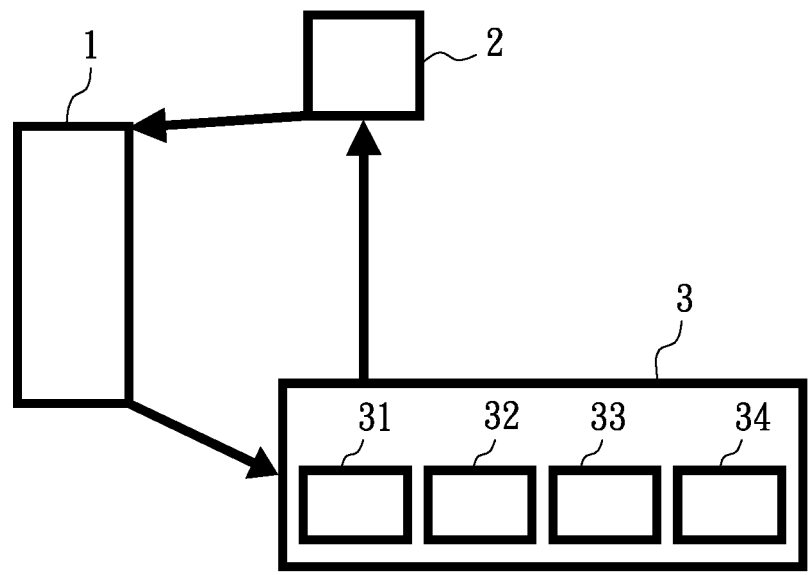
FIG. 1 is a schematic diagram illustrating an array antenna communication system according to an embodiment of the invention.

Referring to FIG. 1, an array antenna communication system is illustrated according to an embodiment of the invention in a schematic diagram.

In FIG. 1, an array antenna communication system is illustrated which is a communication system that receives a location signal generated by a mobile communication apparatus 1 and accordingly transfers a communication signal with a corresponding phase direction. The system includes: an array antenna module 2 and a beamforming circuit 3. For example, the mobile communication apparatus 1 can be one of a mobile phone, a computer, a tablet, and a GPS (global positioning system) device.

The array antenna module 2 includes a plurality of antenna units arranged in array form. In addition, the array antenna module 2 may further include a rotation control unit and rotation unit.

The beamforming circuit 3 is used for receiving a plurality of location signals, a plurality of phase control signals, and transferring a plurality of output signals. The beamforming circuit 3 receives the location signal and accordingly generates the corresponding control signal, and correspondingly controls the antenna unit of the array antenna module 2, so as to enable the antenna unit to move to a position corresponding to a phase and to transfer the plurality of output signals, thereby achieving communication signal enhancement. As shown in FIG. 1, the beamforming circuit 3 includes a signal generation unit 31, a processing unit 32, a control unit 33, and a signal receiving unit 34. For example, the processing unit 32 is one of a computer, a system-on-chip, and an embedded system.

Figure 2:
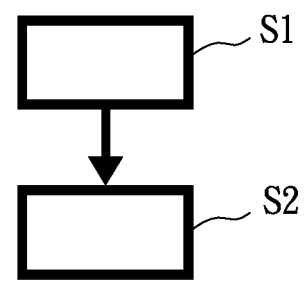
FIG. 2 is a flowchart diagram illustrating a control method for an array antenna communication system according to an embodiment of the invention.

As shown in FIG. 2, a control method for an array antenna communication system is illustrated, which is a control method for a communication system that receives a location signal generated by a mobile communication apparatus 1 and accordingly transfers a communication signal with a corresponding phase direction. The method includes the following steps. As shown in step S1, a beamforming circuit is provided, so as to receive a location signal and accordingly generates a corresponding control signal. As shown in step S2, an array antenna module is provided, so as to receive the control signal and control an antenna unit of the array antenna module to move to a position corresponding to a phase, wherein an output signal is generated by the beamforming circuit and transferred by the array antenna module, thereby achieving communication signal enhancement. The mobile communication apparatus 1 includes one of a mobile phone, a computer, a tablet, and a GPS (global positioning system) device. The array antenna module includes a rotation control unit and a rotation unit. The beamforming circuit includes a signal generation unit, a processing unit, a control unit, and a signal receiving unit, wherein the processing unit is one of a computer, a system-on-chip, and an embedded system.

While the invention has been described by means of specific embodiments, numerous modifications and variations could be made thereto by those skilled in the art without departing from the scope and spirit of the invention set forth in the claims.

What is claimed is:

1. An array antenna communication system for transmission of a communication signal to a mobile communication apparatus which is a mobile computing device, the system comprising:
   an array antenna module, including a plurality of antenna units arranged in array form; and
   a beamforming circuit, wherein the beamforming circuit receives a location signal generated by the mobile communication apparatus and accordingly generates a corresponding control signal, and controls the corresponding antenna unit of the array antenna module to enable the antenna unit to transmit an output signal with a corresponding phase, wherein the array antenna module accordingly transmits the communication signal directed to the mobile communication apparatus, thereby achieving enhancement of the communication signal for the mobile communication apparatus.

2. The array antenna communication system according to claim 1, wherein the mobile communication apparatus includes one of a mobile phone, a computer, a tablet, and a GPS (global positioning system) device.

3. The array antenna communication system according to claim 1, wherein the array antenna module further includes a rotation control unit and a rotation unit.

4. The array antenna communication system according to claim 1, wherein the beamforming circuit includes a signal generation unit, a processing unit, a control unit, and a signal receiving unit.

5. The array antenna communication system according to claim 4, wherein the processing unit is one of a computer, a system-on-chip, and an embedded system.

6. A control method for an array antenna communication system for transmission of a communication signal to a mobile communication apparatus which is a mobile computing device, the method comprising steps of:

providing a beamforming circuit, so as to receive a location signal generated by the mobile communication apparatus and accordingly generates a corresponding control signal;

providing an array antenna module, so as to receive the control signal and correspondingly control an antenna unit of the array antenna module to transmit an output signal with a corresponding phase, wherein the output signal is generated by the beamforming circuit and transmitted by the array antenna module, and the array antenna module accordingly transmits the communication signal directed to the mobile communication apparatus, thereby achieving enhancement of the communication signal for the mobile communication apparatus.

7. The control method for the array antenna communication system according to claim 6, wherein the mobile communication apparatus includes one of a mobile phone, a computer, a tablet, and a GPS (global positioning system) device.

8. The control method for the array antenna communication system according to claim 6, wherein the array antenna module further includes a rotation control unit and a rotation unit.

9. The control method for the array antenna communication system according to claim 6, wherein the beamforming circuit includes a signal generation unit, a processing unit, a control unit, and a signal receiving unit.

10. The control method for the array antenna communication system according to claim 9, wherein the processing unit is one of a computer, a system-on-chip, and an embedded system.

* * * * *